United States Patent
Gopal et al.

(10) Patent No.: US 10,291,310 B1
(45) Date of Patent: May 14, 2019

(54) GAP-BASED ANTENNA MEASUREMENT FOR ANTENNA SWITCH DIVERSITY

(71) Applicant: QUALCOMM Incorporated, San Diego, CA (US)

(72) Inventors: Thawatt Gopal, San Diego, CA (US); Robert Chan, La Jolla, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/948,985

(22) Filed: Apr. 9, 2018

(51) Int. Cl.
| | |
|---|---|
| *H04B 7/185* | (2006.01) |
| *H04B 7/08* | (2006.01) |
| *H04W 88/08* | (2009.01) |
| *H04W 76/28* | (2018.01) |
| *H04B 17/10* | (2015.01) |

(52) U.S. Cl.
CPC ......... *H04B 7/0817* (2013.01); *H04B 17/102* (2015.01); *H04W 76/28* (2018.02); *H04W 88/08* (2013.01)

(58) Field of Classification Search
CPC ... H04B 7/0817; H04B 17/102; H04W 76/28; H04W 88/08
USPC .............. 455/13.3, 73, 82, 575.7, 129, 269
See application file for complete search history.

(56) References Cited

U.S. PATENT DOCUMENTS

| | | | | | |
|---|---|---|---|---|---|
| 4,977,616 | A | * | 12/1990 | Linder ................. | H04B 7/0808 455/277.2 |
| 5,203,024 | A | * | 4/1993 | Yamao ................. | H04B 7/0808 370/334 |
| 5,241,701 | A | * | 8/1993 | Andoh ................. | H04B 7/0808 455/133 |
| 6,330,433 | B1 | * | 12/2001 | Jager .................... | H04B 7/0808 455/135 |
| 8,305,270 | B2 | * | 11/2012 | Waters .................... | G01S 19/36 342/372 |
| 8,340,115 | B2 | * | 12/2012 | Waxman ................ | H04B 7/061 370/437 |
| 9,110,161 | B2 | * | 8/2015 | Waters ..................... | H01Q 3/12 |
| 2007/0002892 | A1 | * | 1/2007 | Waxman ................ | H04B 7/061 370/465 |
| 2008/0291098 | A1 | * | 11/2008 | Kish ...................... | H01Q 3/242 343/725 |

* cited by examiner

*Primary Examiner* — Sonny Trinh
(74) *Attorney, Agent, or Firm* — Ke Liu

(57) ABSTRACT

Systems, apparatuses, and methods for gap-based antenna measurement for antenna switch diversity, where there are fewer number of receivers or transmitters than the number of available antennas. The receivers may switch to additional antennas during a gap and switch back to the previous antennas. A device may select which antennas to use for communications based at least on measurements of additional antennas, thus supporting antenna switch diversity despite having fewer number of receiver chains.

30 Claims, 7 Drawing Sheets

|  | Config-0 | Config-1 | Config-2 | Config-3 |
|---|---|---|---|---|
| Ant1 | Tx/Rx0 | Rx0 |  |  |
| Ant2 | Rx1 | Tx/Rx1 | Rx1 | Rx1 |
| Ant3 |  |  | Tx/Rx0 |  |
| Ant4 |  |  |  | Tx/Rx0 |

FIG. 3

GAP-BASED ANTENNA MEASUREMENT FOR ANTENNA SWITCH DIVERSITY

BACKGROUND

This disclosure relates generally to wireless communication, and more specifically, to gap-based antenna measurement for antenna switch diversity.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

SUMMARY

Systems, apparatuses, and methods are provided for gap-based antenna measurement for antenna switch diversity, where fewer number of receivers or transmitters than the number of available antennas may be supported on a frequency band. The receivers may switch to one or more additional or different antennas during a gap and switch back to the previous antennas. During the gap, the additional or different antennas may be measured on the frequency band. A device may select which antennas to use for communications based at least on measurements of the additional or different antennas, thus supporting antenna switch diversity despite having fewer number of receiver chains. Two sets of antennas may be specified: a first set of one or more antennas ("first antenna set") and a second set of one or more antennas ("second antenna set"), wherein the second antenna set is to be measured during a time gap.

In an aspect, a method for wireless communications is provided. The method may include communicating with a base station on a frequency band on a first antenna set, the first antenna set having at least one of multiple antennas, wherein one or more receivers are coupled with the first antenna set. The method may also include determining that a condition on the first antenna set is triggered. If the condition is determined to be triggered, the method may include switching the one or more receivers to a second antenna set during a time gap in which reception on the first antenna set can be skipped, the second antenna set having another one of the multiple antennas. During the time gap, the second antenna set may be measured on the frequency band, based on one or more signals received on the second antenna set.

In another aspect, a user equipment is provided. The UE may include multiple antennas, one or more receivers, and a processor coupled with the one or more receivers. The processor may be configured to communicate with a base station on a frequency band on a first antenna set, the first antenna set having at least one of multiple antennas, wherein one or more receivers are coupled with the first antenna set. The processor may be further configured to determine that a condition on the first antenna set is triggered. The processor may be configured to switch the one or more receivers to a second antenna set during a time gap in which reception on the first antenna set can be skipped, the second antenna set having another one of the multiple antennas. The processor may also be configured to measure the second antenna set on the frequency band, based on one or more signals received on the second antenna set during the time gap.

In another aspect, an apparatus of wireless communication is provided. The apparatus may include means for communicating with a base station on a frequency band on a first antenna set, the first antenna set having at least one of multiple antennas, wherein one or more receivers are coupled with the first antenna set. The apparatus may include means for determining that a condition on the first antenna set is triggered. The apparatus may also include means for switching the one or more receivers to a second antenna set during a time gap in which reception on the first antenna set can be skipped, the second antenna set having another one of the multiple antennas. The apparatus may further include means for measuring the second antenna set on the frequency band, based on one or more signals received on the second antenna set during the time gap.

In yet another aspect, a non-transitory computer-readable medium is provided that has instructions stored thereon. The instructions may include codes executable for an apparatus to perform communicating with a base station on a frequency band on a first antenna set, the first antenna set having at least one of multiple antennas, wherein one or more receivers are coupled with the first antenna set. The medium may include codes for determining that a condition on the first antenna set is triggered. The medium may include codes for switching the one or more receivers to a second antenna set during a time gap in which reception on the first antenna set can be skipped, the second antenna set having another one of the multiple antennas. The medium may also include codes for measuring the second antenna set on the frequency band, based on one or more signals received on the second antenna set during the gap.

In various aspects, one or more transmitters may be coupled with the first antenna set. The condition may be triggered if a transmit power on the first antenna set exceeds a power level for more than a threshold percentage of time.

In various aspects, the condition may be triggered if a difference between a primary receiver and a secondary receiver in receive signal power on the first antenna set is below a threshold.

In various aspects, the second antenna set may be selected based on physical antenna placement of the second antenna set relative to the first antenna set.

In various aspects, the time gap may be within an inter-frequency or inter-radio access technology measurement gap, or may be within an off-duration of a discontinuous reception cycle.

In various aspects, the one or more receivers may switch back to the first antenna set before the time gap ends.

In various aspects, samples may be captured from one or more signals received during a time gap, and one or more metrics on the second antenna set may be generated based on samples captured during a previous time gap.

In various aspects, a third set of one or more antennas may be determined based at least on measurements on the second antenna set.

Various features and advantages of this disclosure are described in further details below. Other features will be apparent from the description, drawings, and/or the claims.

BRIEF DESCRIPTION OF THE DRAWINGS

Illustrative and non-limiting drawings are provided to aid in the description of various aspects and implementations. Unless specified otherwise, like reference symbols indicate like elements.

FIG. 3 illustrates various examples of antenna configurations in accordance with the present disclosure.

DETAILED DESCRIPTION

Multiple antennas (e.g., in the form of modules, elements or ports) may be placed on a single user device. These antennas may be coupled to one or more receivers and/or transmitters. The availability of multiple antennas may provide spatial diversity for communications because different antennas may experience different channel conditions. By using better antennas or avoiding worse ones, a UE may improve communication reliability and performance. For example, a diversity technique, namely, the antenna switch diversity, may dynamically select one or more antennas, among all the available antennas, that are more suitable for transmission and reception compared to other antennas.

Generally speaking, compared to an antenna element, a receiver/transmitter and its associated radio frequency (RF) chain may entail higher cost and complexity. In some cases, a device maker may not support as many receivers and/or transmitters as available antennas placed on a UE. For example, on some frequency band, a UE may support only two receiver chains, thus coupling only two receivers, despite having three or four or more antennas available.

An antenna switch diversity scheme may make antenna selection decision based on measurements on all available antennas, even though a subset of the antennas may be used at a time. For the antennas currently coupled with the receivers, a UE may measure these antennas during communication sessions with a base station. But the UE may need to measure other (e.g., the currently uncoupled) antennas for purposes of antenna switch diversity because, e.g., channel conditions on some of the other antennas (e.g., the additional or different antennas than the currently coupled ones) may become better or exceed that of the current antennas. Techniques are desired for providing measurements on the additional or different antennas in order to support antenna switch diversity, while controlling the impact to communication operations on the existing antennas before the antenna switch diversity scheme selects a new set of antennas for communication purposes.

Aspects of the disclosure introduced above are described below in the context of a wireless communications system. Examples of antenna couplings and gap-based antenna measurement are then described. Aspects of the disclosure are further illustrated by and described with reference to various apparatus diagrams, system diagrams, and flowcharts.

Figure 1:
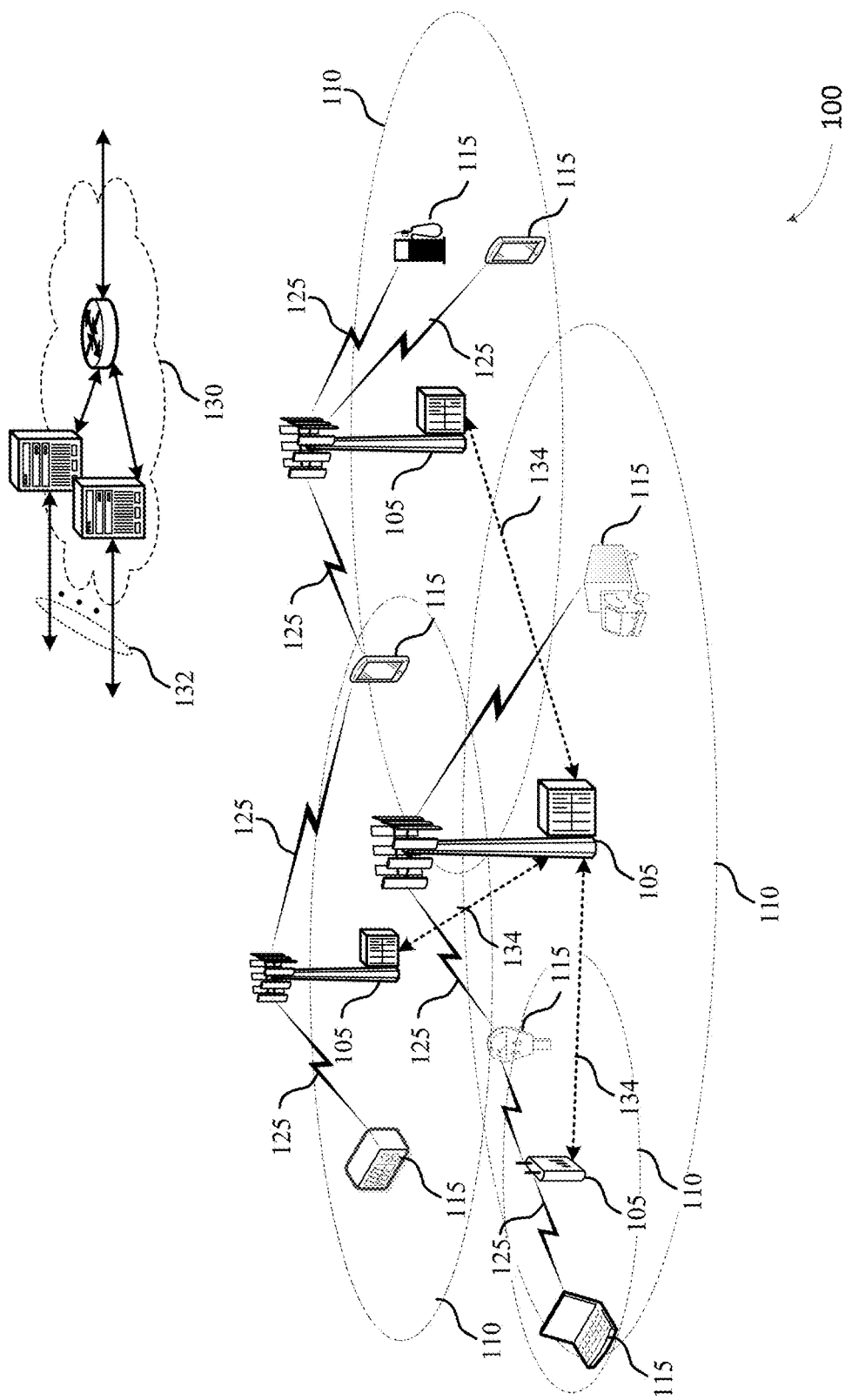
FIG. 1 illustrates an example of a wireless communications system in accordance with the present disclosure.

FIG. 1 illustrates an example a wireless communications system 100 in accordance with the present disclosure. The wireless communications system 100 includes base stations 105, UEs 115, and a core network 130. In some examples, the wireless communications system 100 may be a Long Term Evolution network, an LTE-Advanced (LTE-A) network, an LTE-A Pro network, or a New Radio network.

UEs 115 may be dispersed throughout the wireless communications system 100, and each UE 115 may be stationary or mobile. A user equipment may also be referred to as a subscriber station, an access terminal, a remote terminal, a handset, a user device, or generally a wireless communication device or some other suitable terminology in the context.

Base stations 105 may wirelessly communicate with UEs 115 via communication links 125. A communication link 125 include uplink transmissions from a UE 115 to a base station 105, or downlink transmissions from a base station 105 to a UE 115, or both. Downlink transmissions may also be called forward link transmissions while uplink transmissions may also be called reverse link transmissions. A base station may also be referred to as a base transceiver station, a radio base station, an access point, or some other suitable terminology in the context. Wireless communications system 100 may include different types of base stations 105 (e.g., macro or small cell base stations). Base stations 105 and/UEs 115 may communicate via one or more antennas on one or more communication links 125 to support various Multiple-Input and Multiple Output (MIMO) techniques, such as spatial diversity, multiplexing, or transmit or receive beamforming, and so on. Multiple antennas may be co-located or distributed in diverse geographic location.

Wireless communications system 100 may operate using one or more licensed or unlicensed frequency bands in spectrum. For example, frequency bands in the ultra-high frequency (UHF) region (300 MHz to 3 GHz) are known as decimeter bands, since the wavelengths range from approximately one decimeter to one meter in length. Frequency bands from in a super high frequency (SHF) region (3 GHz to 30 GHz) are known as the centimeter bands. The SHF region includes bands such as the 5 GHz industrial, scientific, and medical (ISM) bands, which may be used opportunistically by devices that can tolerate interference from other users. Frequency bands in extremely high frequency (EHF) region (30 GHz to 300 GHz) are known as the millimeter bands.

Each base station 105 may be associated with a particular geographic coverage area 110 in which communications with various UE 115s are supported. The geographic coverage area 110 for a base station 105 may be divided into one or more sectors and each sector may be associated with a cell. For example, each base station 105 may provide communication coverage for a macro cell, a small cell, a hot spot, or other types of cells, or various combinations thereof. The term "cell" refers to a logical communication entity used for communication with a base station 105 (e.g., over a carrier), and in some context, may also refer to a portion of a geographic coverage area 110 (e.g., a sector) over which the logical entity operates. A cell may be associated with an identifier for distinguishing neighboring cells operating via the same or a different carrier. The term "carrier" may generally refer to a set of radio frequency spectrum resources having a defined organizational structure for supporting uplink or downlink communications over a communication link 125. For example, a carrier may include a portion of a radio frequency spectrum referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include various network entities, such as a mobility management entity (MME), a serving gateway (S-GW), and a Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

The wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds ($Tf=307200*Ts$). The radio frames may be identified by a system frame number (SFN) ranging from 0 to 1023. Each frame may include ten subframes numbered from 0 to 9, and each subframe may have a duration of 1 millisecond (ms). A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods.

A resource element may consist of one symbol period (e.g., a duration of one modulation symbol) and one sub-carrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain (1 slot), or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

For illustrative purposes, the following examples and figures may be described with reference to UE 115 and base station 105 of FIG. 1; however, types of UEs or base stations may be used in same or other examples without limiting the scope of the present disclosure.

Figure 2:
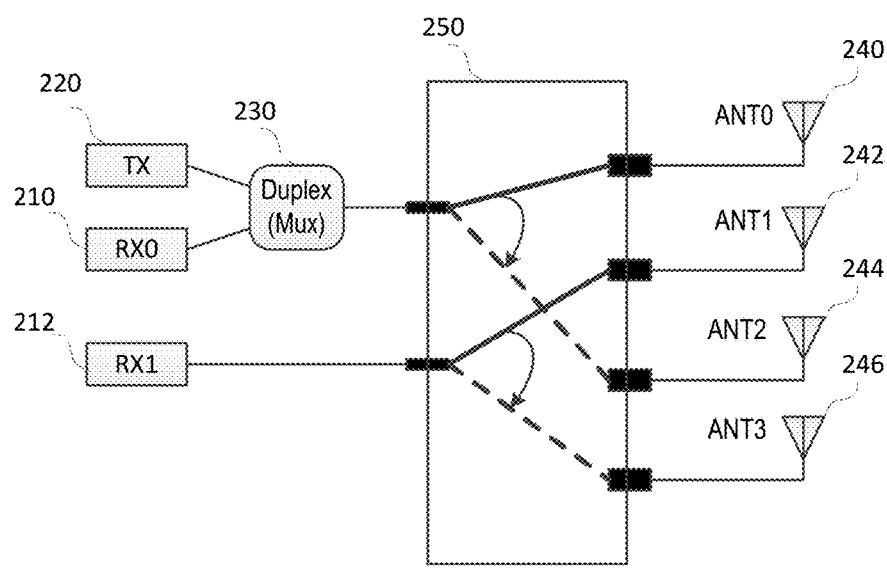
FIG. 2 illustrates an example of radio frequency paths coupling receivers or transmitters with antennas in accordance with the present disclosure.

FIG. 2 illustrates an example of radio frequency paths coupling receivers or transmitters with antennas in accordance with the present disclosure. In this nonlimiting illustrative example, two receivers and a transmitter may be coupled with, and switched to, two out of four antennas. However, designs and principles described herein generally apply to other configurations in the number of receivers, transmitters, and/or antennas.

A radio frequency path may couple a receiver (RX) or a transmitter (TX) with an antenna (ANT), providing RF signal connectivity between them. RF connectivity may be realized using various types of conductors (e.g., metal pieces) or semiconductors (e.g., transistors), and a RF path may also include one or more various RF devices or components such as switches, connectors, filters, and amplifiers. As used herein, the term "RF path" may also be referred as RF connection, RF chain, or other suitable terminology.

An antenna (e.g., 240, 242, 244 or 246) may provide physical means for transmitting and/or receiving electromagnetic (or radio) waves propagating through a medium (e.g., space). Through its terminals, an antenna may be connected to a transmitter and/or a receiver. In transmission, an antenna may radiate as an electromagnetic wave a transmit signal (e.g., an electric current) supplied by a transmitter (e.g., TX 220). The transmitter may generate the transmit signal from transmit information symbols. For example, The TX 220 may include a baseband processor that may modulate transmit information symbols onto a baseband waveform, and a RF frontend that may up-covert the baseband waveform onto a RF waveform. In reception, an antenna may supply a receiver (e.g., RX0 210 or RX1 212) a receive signal (e.g., an electric current) produced by intercepting some of the power of an electromagnetic wave. The receiver may generate receive information symbols from the received signal. For example, The RX0 210 or RX1 212 may include a RF frontend that may down-convert a RF waveform to a baseband waveform, and a baseband processor that may demodulate the baseband waveform into receive information symbols. In some cases, a transceiver may embody both a transmitter and a receiver.

An antenna may be coupled with both a transmitter and a receiver, e.g., TX 220 and RX0 210 as illustrated in the figure. A duplexer or multiplexer (e.g., 230) may be used to connect a transmitter (e.g., TX 220) and a receiver (e.g., RX0 210) onto a single RF path. For Frequency Division Multiplexing, wherein transmit and receive RF waveforms are on separate carriers, the duplexer/mux 230 may include a duplex RF filter that may allow passage of the transmit and receive RF waveforms simultaneously (i.e., in full duplex). However, in some cases, the duplexer/mux 230 may only support partial (or half) duplex, in which transmission and reception may not occur at the same time. For example, transmit and receive RF waveforms may pass through the duplexer/mux 230 at different time instances. For Time Division Multiplexing, wherein a single carrier may be used for transmission and reception, a transmitter and receiver may be multiplexed together by the duplexer/mux 230 without a duplex RF filter.

A RF path circuit 250 may couple one or more of RF paths with one or more antennas. In some cases, the RF path circuit 250 may switch the RF paths from a set of antennas to a different set of antennas or may change RF path couplings within the same set of antennas. For example, as illustrated in the figure, RX0 210 and RX1 212 may be coupled with ANT0 240 and ANT1 242 (e.g., RX0 210 via the duplexer/mux 230 with ANT0 240 and RX1 212 with ANT1 242), and may be switched to ANT2 244 and ANT3 246 (e.g., RX0 210 via the duplexer/mux 230 with ANT2 244 and RX1 212 with ANT3 246).

A receiver may be designated as a primary receiver; another receiver a secondary receiver. Such designation may not have significances other than being convenient identifiers. However, in some cases, a primary receiver may be provided with different preferences, configurations or processes than a secondary receiver; for example, a control loop may be run on a primary receiver but not on a secondary receiver. In some scenarios, a transmitter and a primary antenna may be coupled with a same antenna.

Spatial diversity may be provided by multiple antennas. Because different antennas may experience different signal qualities or radio conditions, some antennas may be better than the others, such as having, e.g., higher signal power, lesser interference, and/or smaller signal loss. By coupling transmitters and/or receivers with better antennas among all available antennas, the antenna switch diversity scheme may provide spatial diversity to improve communication performance, without the use of a large number of transmitters and/or receivers. For example, a single transmitter or receiver with one RF chain can exploit spatial diversity by switching to a better (or best) antenna among multiple antennas. For antenna switch diversity, different set of one or more antennas may be selected based on measurements on available antennas, and antenna switch may occur dynamically from time to time.

Antenna switch diversity may also help mitigate impact of blockage of one or more antennas. In some cases, while holding a device, a user may block transmission and/or reception on an antenna by, e.g., user's hand, head, or an object. If antennas are spaced apart or placed in different locations, not all of the antennas may be blocked at the same time. By switching to antennas with lesser or no blockage, a device may exploit spatial diversity to improve performance.

FIG. 3 illustrates various examples of antenna configurations in accordance with the present disclosure. Two receivers (Rx0 and Rx1) and one transmitter (Tx) are supported, but four antennas (Ant1 to Ant4) are available. In some cases, a device may not support 4-by-4 MIMO (with four transmitters and/or four receivers) in some frequency bands (e.g., LTE band 34), for example, as certain device makers may choose to provide less receiver/transmitter chains than the number of available antennas for all or some of the frequency bands to reduce cost or power consumption. But fewer receivers and transmitters may still exploit antenna switch diversity afforded by the availability of additional antennas, e.g., as generally described with reference to FIG. 2.

Each configuration, shown as a column (320, 322, 324, or 326) in the figure, denotes particular couplings between two receivers and a transmitter with a particular pair of antennas. By changing the antenna configuration, a device may switch the two receivers and/or one transmitter among the four available antennas. In configuration 0, Rx0 and Tx are coupled with Ant1 310, and Rx1 with Ant2 312. Configuration 1 is similar to configuration 0, except that Tx is coupled with Ant2 312 instead of Ant1 310. In configuration 2, Rx0 and Tx are coupled with Ant3 314, and Rx1 with Ant2 312. In configuration 3, however, Rx0 and Tx are coupled with Ant4 316, and Rx1 with Ant2 312.

In this example, Rx0 may be designated as a primary receiver, whereas Rx1 a secondary receiver. The transmitter (Tx) and the primary receiver (Rx0) may be coupled with the same antenna, except for configuration 1 where Tx is coupled to the secondary receiver (Rx1). Although in configuration 0 to 3, the secondary receiver is coupled with the same Ant2 312, other configurations may be specified (not shown) so that the secondary receiver may be coupled with a different antenna.

In some cases, the antennas may be physically located at various positions on a device such that a user blocking one antenna may be less likely to block another. For example, the four antennas (310, 312, 314, 316) may be place at the four different corners of a rectangular shape of a user device. Hence, if a user's hands may block an antenna at a bottom corner, an antenna at a top corner (e.g., opposite to the blocked antenna) may be better suited for transmission and reception. A device may switch to the better antenna by changing the antenna configuration (e.g., from configuration 0 to configuration 2, such that the primary receiver is switched from Ant1 310 to Ant3 314).

Figure 4:
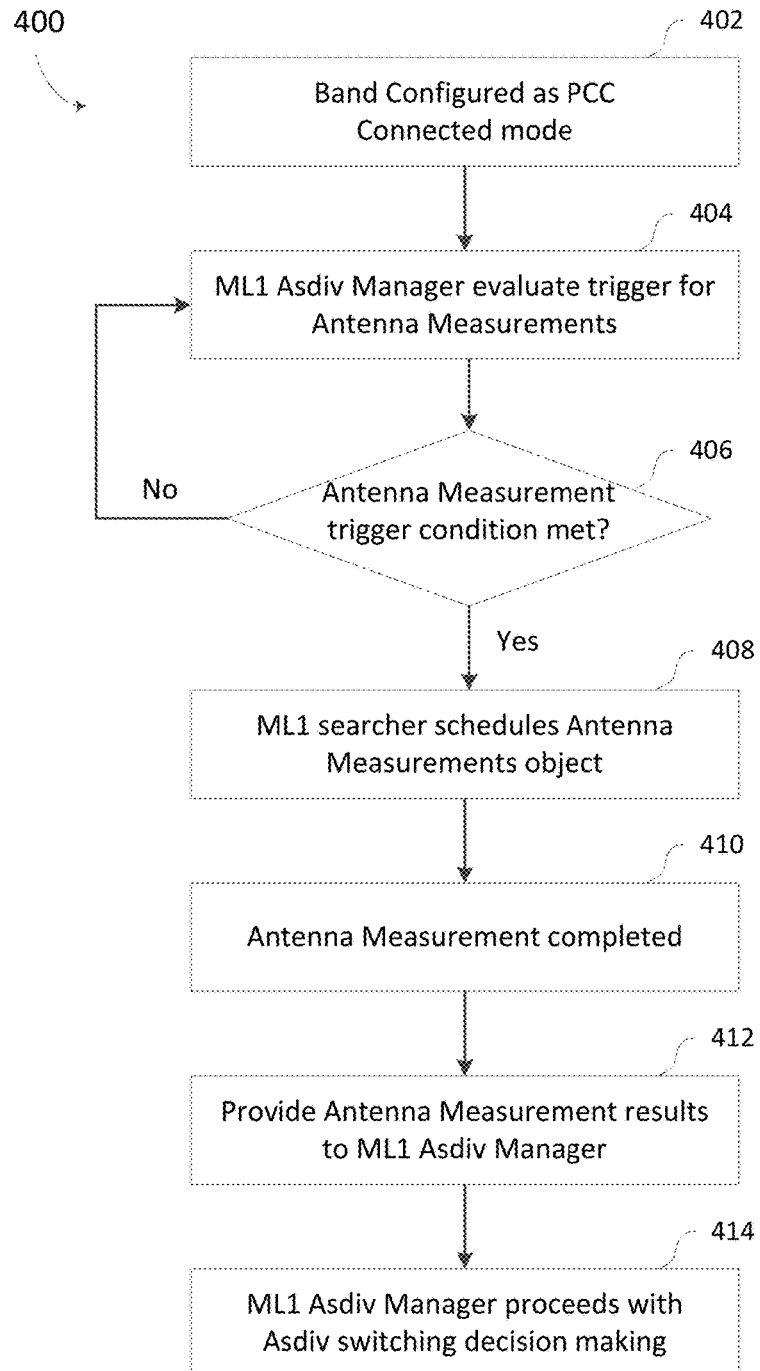
FIG. 4 illustrates an example of a control flow that supports gap-based antenna measurement for antenna switch diversity in accordance with the present disclosure.

FIG. 4 illustrates an example of a control flow 400 that supports gap-based antenna measurement for antenna switch diversity in accordance with the present disclosure. Various steps of the control flow 400 may be implemented by a suite of modules, collectively referred to as Management Layer 1 (ML1), which generally control various aspects of lower layer communication operations in UE.

At block 402, a frequency band may be configured as having a primary component carrier (PCC). A UE may be in a RRC connected mode under which the UE is in active communications on the frequency band with a base station. In some cases, a UE may support fewer receivers and transmitters on the frequency band than the number of available antennas. For example, with reference to FIG. 3, a UE may only support two receivers and one transmitter on the frequency band, despite having four antennas.

Antenna switch diversity (Asdiv) may exploit spatial diversity despite the number of transmitters and receivers being less than the number of available antennas. A ML1 Asdiv manager may select a set of antennas among all available antennas and may switch antenna couplings from one configuration to another configuration.

At block 404, the ML1 Asdiv manager may evaluate a condition (or referred to as a "trigger") for measuring additional or different antennas (not currently coupled with the one or more transmitters and receivers). Such evaluation may be performed periodically from time to time or in response to a particular event. Various trigger conditions may be specified that may indicate a degradation in some quality metric of the current antennas with respect to performance of antenna switch diversity. The following describes a few, non-exhaustive, examples, some or all of which may be combined to define a joint trigger condition.

For example, a trigger condition may be based on how often a mobile transmit power level (MTPL) would exceed a particular (e.g., maximum) transmit power level. In many cases, to compensate for loss of signal strength by the radio channel, a transmitter often boost a transmit power to target a certain level of receive power (as in some uplink power control scheme). Thus, the more often the MTPL would exceed the particular power level, the more likely that the antenna coupled to the transmitter may suffer from a more degraded channel condition (e.g., a larger blockage, fading or path loss). In an implementation, the condition may be triggered if the MTPL exceeds a maximum power level (e.g., 23 dBm) for more than a certain threshold percentage of time (e.g., 50% of time during an observation time window (e.g., 640 ms)).

In another example, a trigger condition may be based on a difference (or a "delta") of a receive signal power between a primary receiver and a secondary receiver. Various receive signal power may be used, such as, for example, reference signal receive power (RSRP) which may indicate average received power of a reference (or pilot) signal. In some cases, it may be preferred that receive signal power be higher on the primary receiver than the secondary receiver, in part because a transmit may be coupled with the same antenna as the primary receiver (and thus may encounter a better channel). The condition may be triggered if such difference (e.g., RSRP delta) in receive signal power is below a threshold (e.g., when a (filtered) RSRP value of the primary receiver minus that of the secondary receiver is less than 5 dB in an observation window).

In yet another example, a trigger condition may be based on a degradation in receive signal power (e.g., RSRP) of one or more receivers. The condition may be triggered if a receive signal power is dropped by more than a threshold (e.g., when RSRP on a receiver antenna drops by more than 5 dB consistently in an observation window).

At block 406, if the condition is triggered, e.g., as described above, a ML1 searcher may schedule one or more antenna measurement objects at block 408. The ML1 searcher may generally control various aspects of cell measurement, search, and acquisition operations. A measurement object may contain information regarding a carrier frequency on which measurements are to be taken. In some cases, a reference signal of a cell may be measured on the carrier frequency on the frequency band.

To reduce disruption to active communication on the frequency band, measurement of different or additional antennas may be scheduled during a gap of time in which reception and/or transmission on the currently coupled antennas can be skipped. During such a gap, a UE may switch (or tune away) to one or more additional antennas, measure these antennas on the frequency band, and switch (or tune back) to the antennas previously in use.

An inter-frequency or inter-RAT (radio access technology) measurement gap may provide an antenna measurement opportunity. In some cases, a serving base station may configure one or more measurement gaps for a UE to measure neighbor cells on other frequency band than the serving frequency band (i.e., inter-frequency measurement) or cells of other RATs (i.e., inter-RAT measurement). During such a measurement gap, the UE is not expected to receive a data or control channel from the base station and can tune away to other, non-serving frequencies for measurement. Thus, instead of tuning to a different frequency band, a UE may "repurpose" these inter-frequency or inter-RAT measurement gaps for measuring additional or different antennas on the same frequency band as the previous antennas.

Discontinuous reception (DRX) may provide another antenna measurement opportunity. When a UE is in a RRC connected mode, the DRX mode may also be referred to as Connected Mode DRX (CDRX), which may have a series of short and/or long DRX cycles. Generally speaking, a DRX cycle may include an ON-duration during which a UE is expected to actively receive signals from a base station, and an OFF-duration during which the UE may sleep (i.e., need not receive signals from the base station). A DRX cycle may be followed by another, thus creating a pattern of alternating ON or OFF durations. A UE may "repurpose" a portion of DRX OFF-duration for antenna measurement: Instead of powering down the RF, the UE may temporarily wake up to measure the additional antennas during an OFF-duration.

Figure 5A:
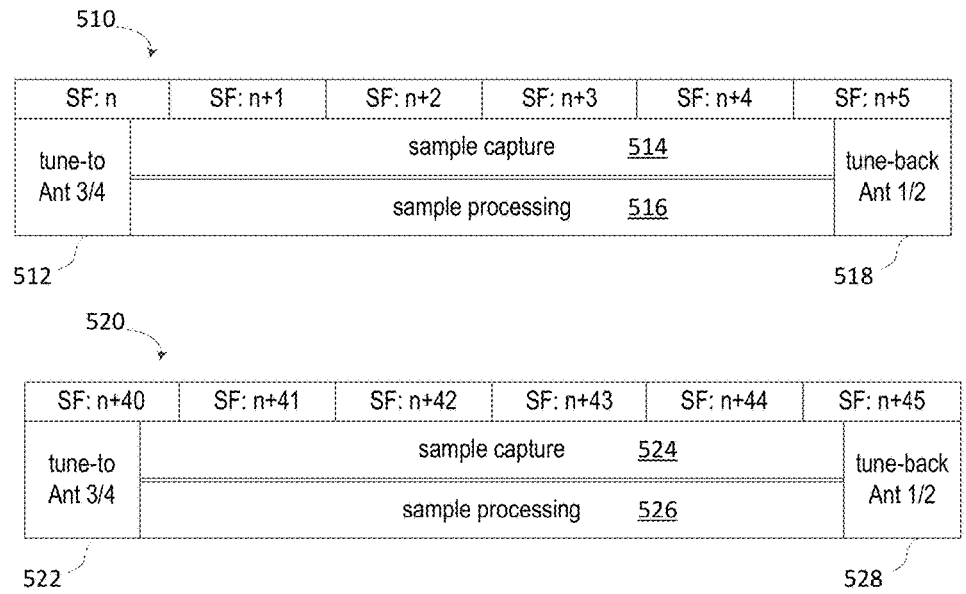
FIG. 5A illustrates an example of measurement operations within a gap in accordance with the present disclosure.
Figure 5B:
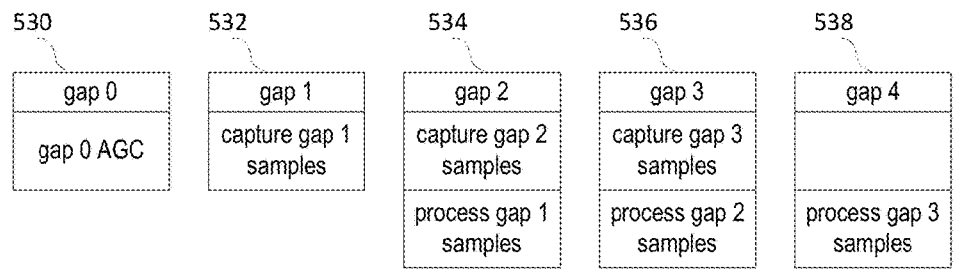
FIG. 5B illustrates an example of pipelining measurement operations across multiple gaps in accordance with the present disclosure.

At block 410, a UE may perform or complete various antenna measurement operations associated with an antenna measurement gap. FIGS. 5A and 5B provide further details on various aspects of the gap-based measurement operations. But generally speaking, the antenna measurement may involve one or more antenna measurement gaps. Samples may be captured from one or more signals received on the additional or different antennas within these gaps; for example, a reference (or pilot) signal from a cell, e.g., a LTE common reference signal (CRS), may be received. One or more metrics (e.g., RSRP) may be generated from the captured samples, and the measurement results may be provided to the ML1 Asdiv manager at block 412.

A variety of downlink measurements may be provided, such as RSRP, reference signal received quality (RSRQ), a reference signal strength indicator (RSSI), and so on. Generally speaking, the measurements may reflect a quality of a measured antenna with respect to antenna switch diversity; for example, a higher RSRP may indicate better channel condition for the measured antenna.

At block 414, the ML1 Asdiv manager may make an Asdiv switching decision based at least on the antenna measurements. Since an antenna already coupled with a receiver in communications with a base station may be measured without the use of a "tune away" gap, the ML1 Asdiv manager may keep track of all available antennas using the gap-based antenna measurements for additional or different antennas. In some cases, the ML1 Asdiv manager may select among all the antennas a few best antennas (e.g., top two with highest RSRP) and couple the receivers and transmitters with these antennas for communications with a serving base station. In an implementation, the ML1 Asdiv manager may select an antenna configuration that may achieve a better performance than the current antenna configuration.

FIG. 5A illustrates an example of measurement operations within a gap in accordance with the present disclosure. Consider, for example, a case where the first pair of antennas (Ant 1 and Ant 2) are currently coupled to two receivers, whereas a second pair of antennas (Ant 3 and 4) are to be measured during one or more antenna measurement gaps. As described with reference to FIG. 4, the antenna measurement gaps may be scheduled during the time a device need not receive on the first antenna pair, e.g., during an inter-frequency or inter-RAT measurement gap, or during an OFF duration of a DRX cycle.

As shown in the example, a gap 510 may have a duration of six contiguous subframes, numbered from n to n+5, with each subframe being 1 ms in duration. The duration of an antenna measurement gap may be chosen based on the duration of samples to be captured; for instance, a gap of 6 ms may cover 5.1 ms of signals to be sampled.

During a time interval 512 within the gap 510, a device may tune (away) to the second antenna pair (Ant 3/4) from the first antenna pair (Ant 1/2). And before the gap 510 ends, the device may tune back to the first antenna pair during another time interval 518. Since the second antenna pair are to be measured on the same frequency band as the first antenna pair, the switch between different antennas may be accomplished within less amount of time than if the receivers would be tuned to a different frequency band (e.g., during an inter-frequency RF tune-away). In some implementations, an antenna switching may be completed within 0.35 ms, allowing sufficient time for measurement operations between the "tune-away" time interval 512 and the "tune-back" time interval 518.

A number of operations may be performed during an antenna measurement gap (e.g., the gap 510). The term "measurement operation" may generally refer to any operation relating to the preparation and performance of antenna measurement. For example, new samples may be captured from one or more signals received on the second antenna pair (Ant 3/4) during the gap 510 by a sample capture operation 514. A sample processing operation 516 may generate one or more metrics based on previously and/or currently captured samples. The two operations 514 and 516 may be performed concurrently (e.g., in parallel) or sequentially in time with respect to each other.

Another gap 520 may be scheduled after the gap 510. Between the gap 510 and the gap 520, the receivers may continue to use the first antenna pair (Ant 1/2). The antenna measurement gaps may be scheduled periodically, with regular or equal separation in time between two consecutive gaps. Periodic gaps may be based on, for example, a periodicity of inter-frequency or inter-RAT measurement gaps or of DRX cycles. In other cases, consecutive gaps may arrive with irregular time separation, for example, in response to an aperiodic event (such as an one-time scheduling request).

As shown in the figure, the gap 520 is scheduled 40 ms after the gap 510, which may be based on a 40 ms periodic inter-frequency measurement gap configured for a UE. The gap 520 may be the same as or similar to the gap 510 in terms of time structure and operations performed within. For example, the receivers may be tuned to Ant 3/4 in 522 and turned back to Ant 1/2 in 528, and in between, a sample capture operation 524 and a sample processing operation 526 may be performed. But, new samples are captured during the gap 520, which may provide updated measurement compared to the previous gap 510. In other cases, an antenna measurement gap may be different from another in terms of time structure and/or operations performed. For example, an antenna measurement gap may be shorter in duration than another if less samples are to be captured, or may have fewer operations performed than another.

FIG. 5B illustrates an example of pipelining measurement operations across multiple gaps in accordance with the present disclosure. In some cases, a device may not have sufficient time in a gap to generate measurement metrics on the newly captured samples during the same gap. For example, a sample processing operation (e.g., 516 or 526) may not begin, and may use additional 5 ms to generate RSRP metric, until after a substantial number of samples have been captured. Pipelining (or staggering) various operations across gaps may alleviate some time budget constraints and improve efficiency. For example, while capturing new samples in a current gap, a device may postpone processing of the current samples and instead process samples of a previous gap.

As shown in the figure, during gap 0 (530) after tuning away to additional antennas, a device may run an automatic gain control (AGC) on signals received on these antennas. The AGC may adjust amplification gain in order to maintain received signals within a suitable amplitude range, for example, for better sampling performance Before the AGC converges to a proper setting, samples may not be captured for measurement purposes during the gap 0.

A device may start capturing samples in gaps following gap 0 (530). For example, at gap 1 (532), samples are captured from signals received during gap 1 (532); however, sample processing of the newly captured samples may be postponed till a next gap. At gap 2 (534), the gap 1's samples may now be processed, and also new samples are captured from signals received during gap 2 (534).

The pattern of pipelining may continue for next one or more gaps. For example, at gap 3 (536), gap 3's samples are captured, and gap 2's samples are processed. At a last gap (e.g., gap 4 (538) in the example), no new samples may be captured while a last batch of samples captured in a previous gap (e.g., gap 3) are processed.

Figure 6:
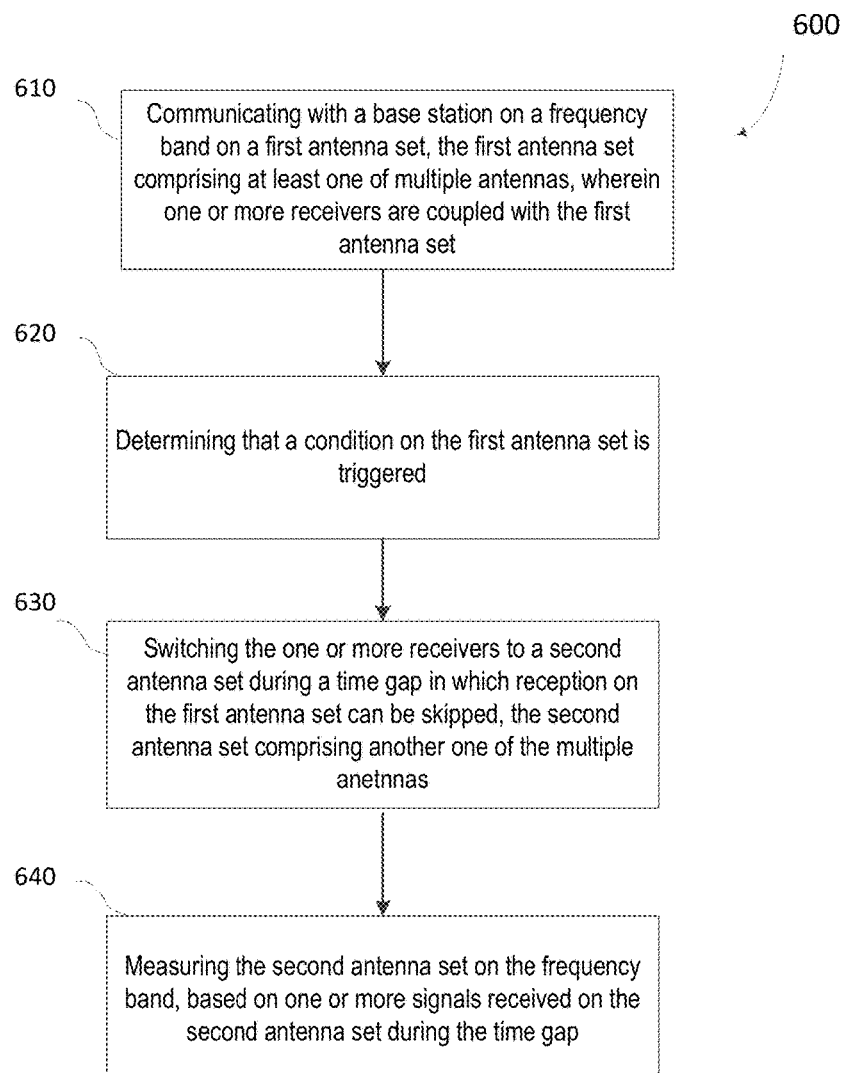
FIG. 6 illustrates an example of a method that supports gap-based antenna measurement for antenna switch diversity in accordance with the present disclosure.

FIG. 6 illustrates an example of a method 600 that supports gap-based antenna measurement for antenna switch diversity in accordance with the present disclosure. The method 600 may encompass various aspects of the control flow 400 and measurement operations as described with reference to FIGS. 5A and 5B. A UE (or its one or more components) may implement the method 600 using hardware, firmware, or software, or a combination thereof.

At block 610, a UE may communicate with a base station on a frequency band on a first antenna set, wherein the first antenna set may include at least one of multiple antennas. One or more receivers may be coupled with the first antenna set. In addition, one or more transmitters may be coupled with the first antenna set. With reference to FIG. 2, a transmitter and/or a receiver is coupled to an antenna when the transmitter and/or a receiver is connected to the antenna through a RF path.

Despite having four antennas, a UE may support only two receivers and one transmitter on a particular frequency band (e.g., LTE band 34). The first antenna set may correspond to a particular antenna configuration, such as, configuration 0 as described with reference to FIG. 3, in which Ant1 and Ant2 are coupled to Rx0 and Rx1, while Ant3 and Ant4 are not currently used. In some implementations, Rx0 may be designated as a primary receiver, and Rx1 a secondary receiver.

At block 620, it may be determined that a condition on the first antenna set is triggered. The condition may be related to performance of antenna switch diversity. A UE may monitor a "trigger" condition for measuring additional or different antennas (e.g., Ant 3/4), e.g., as described in blocks 404 and 406 with reference to FIG. 4. In some cases, the condition may be triggered if a transmit power (e.g., MTPL) on the first antenna set exceeds a power level (e.g., a maximum power level) for more than a threshold percentage of time. The percentage threshold may be adjusted based on a tolerance for fluctuation in transmit power.

The condition may also be triggered if a difference between a primary receiver and a secondary receiver in receive signal power on the first antenna set is below a threshold. The receive signal power may be based on a reference signal from a cell, for example, RSRP, and may be a value measured in a time instance or filtered over a period of time. In some implementation, the "delta" threshold may be a positive dB value, reflecting a preference of the primary receiver over the secondary receiver.

The condition may also be triggered if a receive signal power on the first antenna set is degraded by more than another threshold. The receive signal power may be associated with a particular receiver (e.g., a primary receiver), or with multiple or all of the receivers (e.g., as an average or total receive signal power).

At block 630, the one or more receiver may be switched to a second antenna set during a time gap in which reception on the first antenna set can be skipped. The second antenna set may include another one of the multiple antennas. The second antenna set may be the same as the first antenna set (meaning both contain same antennas); nevertheless, RF couplings between the receivers and the antennas may change so that a receiver may be coupled with a different antenna. But more generally, the second antenna set may be different from the first antenna set, meaning that the second antenna set may include an antenna not in the first antenna set, and/or vice versa. In some cases, the second antenna set may be non-overlapping with the first antenna set, meaning the first and second antenna sets do not include an antenna in common, such as, when the second antenna set contains the other two unused antennas (e.g., Ant 3/4) if the first antenna set contains Ant 1/2. In other cases, the second antenna set may have one or more antennas in common with the first antenna set. For example, with reference to FIG. 3, the first antenna set may correspond to the configuration 0 with Ant 1/2, whereas the second antenna the configuration 2 with Ant 1/3.

A device may select the second antenna set in various ways. For example, given a current antenna configuration (e.g., configuration 0) used by the receivers and transmitters, a different antenna configuration (thus determining the corresponding second antenna set) may be chosen from the other configurations (e.g., configurations 1 to 3). In some cases, given the first antenna set, the second antenna set may be chosen from the rest of available antennas not in the first antenna set. In one aspect, the second antenna set may be selected based on its physical antenna placement relative to the first antenna set. For example, if the first antenna set contains an antenna located at a bottom corner, the second antenna set may contain an antenna located in a top corner (e.g., which may be farther to the bottom-corner antenna than any other antenna).

One or more antenna measurement gaps may be scheduled, e.g., as described in block 408 with reference to FIG. 4 and may have a time structure, e.g., as described with references to FIG. 5A. In some cases, such a time gap may be within an inter-frequency or inter-RAT measurement gap, even though receivers may not tune to a different frequency band. In some other cases, the time gap may be within an OFF-duration of a DRX cycle, even though the receivers may wake up during the time gap to measure additional or different antennas and return to sleep afterwards. Generally speaking, an implementation may use other ways to obtain antenna measurement gaps for the second antenna set as long as reception and/or transmission on the first antenna set can be skipped.

A device may switch to the second antenna set by changing RF paths that couple the receivers with the antennas, e.g., as generally described with reference to FIG. 2. The "tune-away" may be performed during a beginning portion of an antenna measurement gap. The device may also switch back to the first antenna set from the second antenna set before the gap ends (e.g., during an ending portion of the time gap), and thus may resume communications using the first antenna set after the time gap.

At block 640, the second antenna set may be measured on the frequency band, based on one or more signals received on the second antenna set during the time gap. Various measurement operations may be performed during the time gap, for example, as described in block 410 with reference to FIG. 4 and as elaborated with reference to FIGS. 5A and 5B. A receive signal power (e.g., RSRP) may be measured from a signal received on the second antenna set during an antenna measurement gap. In some cases, sample capture and processing operations may be pipelined across multiple time gaps. For example, samples may be captured from one or more signals received during a time gap, and one or more metrics on the second antenna set may be generated based on samples captured during a previous time gap.

A device may decide which antennas to use for antenna switch diversity based at least on measurements (e.g., RSRP metrics) on the second antenna set. With the measurements on the additional or different antennas, the device may obtain measurements on all available antennas, among which a third set of one or more antennas ("third antenna set") may be selected. For example, the third antenna set may show a better channel condition than the first antenna set (e.g., higher RSRP, or less often that MPTL would exceed maximum power level). In some cases, the third antenna set may be the same as the second antenna set (measured during the antenna measurement gaps), but may be different from the second antenna set, e.g., when containing an antenna from the first antenna set and another antenna from the second antenna set.

Figure 7:
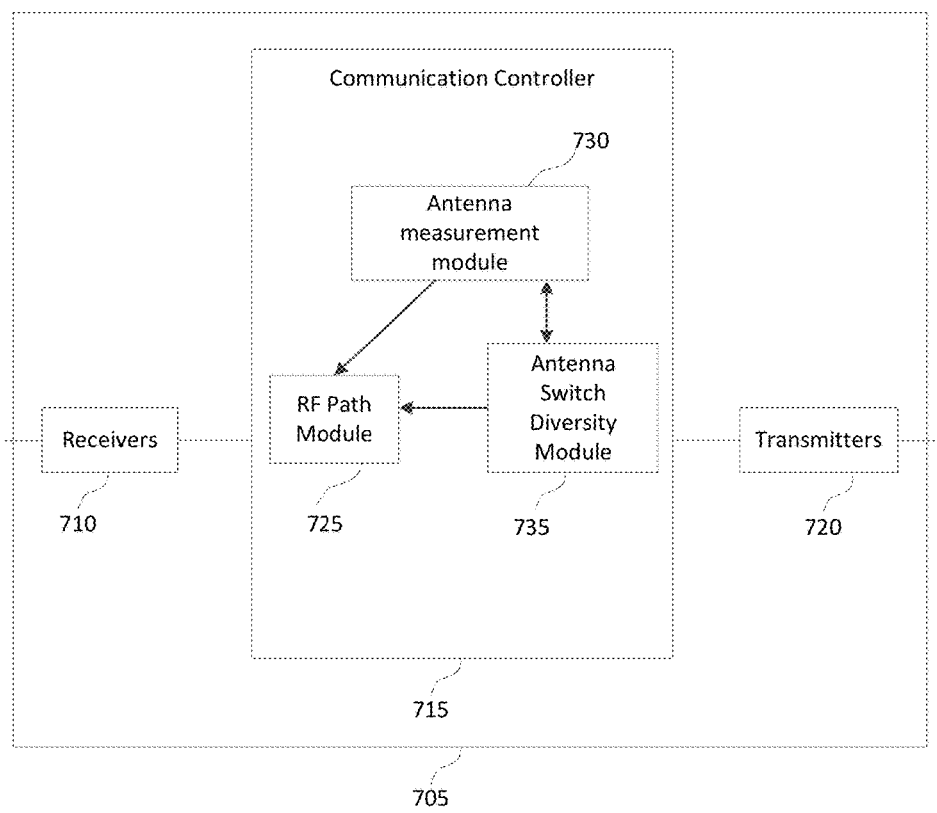
FIG. 7 illustrates an example of an apparatus that supports gap-based antenna measurement for antenna switch diversity in accordance with the present disclosure.

FIG. 7 illustrates an example of an apparatus 705 that supports gap-based antenna measurement for antenna switch diversity in accordance with the present disclosure. The apparatus 705 may include one or more receivers 710, one or more transmitters 720, and a communication controller 715, and may perform various aspects of the control flow 400 and the method 600 described with reference to FIGS. 4 and 6. The apparatus 705 may be embodied by, or resides within, a UE 115 with reference to FIG. 1.

The one or more receivers 710 may receive information such as packets, user data, or control information associated with various information channels. Information may be passed on to other components of the apparatus. The receivers 710 may utilize a single antenna or a set of multiple antennas. The one or more transmitters 720 may transmit signals generated by other components of the apparatus. In some examples, the transmitters 720 may be collocated with a receivers 710 in one or more transceiver modules. The transmitters 720 may utilize a single antenna or a set of multiple antennas. The receivers 710 and transmitters 720 (or transceivers incorporating both) may be coupled to the communication controller 715.

In some cases, a UE may support fewer number of receivers 710 and/or transmitters 720 than the number of available antennas on a frequency band. For example, only two RF chains may be provided to couple two receivers with two out of four antennas on a LTE band.

The communication controller 715 may provide means for communicating with a base station on a frequency band on a first antenna set, wherein the first antenna set may include at least one of multiple antennas (e.g., two antennas of four available antennas on LTE band 34). The receivers 710 may be coupled with the first antenna set, and the transmitters 720 may also be coupled with the first antenna set.

The communication controller 715 may be a baseband modem or an application processor or may illustrate aspects of a baseband or application processor. The communication controller 715 or at least some of its various sub-components may be implemented in hardware, software executed by a processor, firmware, or any combination thereof. If implemented in software executed by a processor, the functions of the communication controller 715 or at least some of its various sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure. Software may comprise codes or instructions stored in a memory or like medium that is connected or in communication with the process described above. The codes or instructions may cause the processor, the apparatus 705, or one or more components thereof to perform various functions described herein.

The communication controller 715 or at least some of its various sub-components may be physically located at various positions, including being distributed such that portions of functions are implemented at different physical locations by one or more physical devices. In some examples, the communication controller 715 or at least some of its various sub-components may be a separate and distinct component. In other examples, the communication controller 715 or at least some of its various sub-components may be combined with one or more other hardware components, including but not limited to an I/O component, a transceiver, a server, another computing device, one or more other components described in the present disclosure, or a combination thereof in accordance with various aspects of the present disclosure.

The communication controller 715 may include a RF path module 725, an antenna measurement module 730, and an antenna switch diversity module 735. The RF path module 725 may provide means for coupling RF paths between the receivers 710 and/or transmitters 720 with a set of one or more antennas, and for switching the RF paths to a second set of antennas, e.g., as generally described with reference to FIG. 2. In some aspects, the RF path module 725 may be instructed by the antenna switch diversity module 735 to couple the receivers 710 with a first antenna set of one or more antennas for communications on a frequency band. In addition, the transmitters 720 may also be coupled with the first antenna set. The RF path module 725 may also be instructed by the antenna measurement module 730 to switch the receivers 710 to a second antenna set of one or more antennas for purposes of antenna measurement.

The antenna measurement module 730 (or the antenna switch diversity module 735) may select the second antenna set in various ways. For example, given a current antenna configuration used by the receivers and transmitters, a different antenna configuration (thus determining the corresponding second antenna set) may be chosen from the other configurations. In some cases, given the first antenna set, the second antenna set may be chosen from the rest of available antennas not in the first antenna set. In one aspect, the second antenna set may be selected based on its physical antenna placement relative to the first antenna set. For example, if the first antenna set contains an antenna located at a bottom corner, the second antenna set may contain an antenna located in a top corner.

The antenna measurement module 730 may provide means for various operations relating to preparation and performance of antenna measurement. The antenna measurement module 730 may determine whether a condition on the first antenna set is triggered. The condition may relate to performance of antenna switch diversity. The antenna measurement module 730 may also measure or monitor channel conditions on the first antenna set, which may indicate performance of antenna switch diversity using the first antenna set. Measurements on the first antenna set may be obtained during a communication session and may not involve a "tune-away" antenna measurement gap. Various trigger conditions may be used, e.g., based on transmit power, difference in receive signal power between receivers, and/or degradation in receive signal power, as described with reference to block 404 of FIG. 4.

If the condition is triggered, the antenna measurement module 730 may schedule one or more antenna measurement gaps and may instruct the RF path module 725 to switch the receivers 710 from the first antenna set to the second antenna set during the antenna measurement gaps. An antenna measurement gap may be chosen such that reception on the first antenna set can be skipped, such as, e.g., during an inter-frequency or inter-RAT measurement gap configured for a UE, or during an OFF-duration of a DRX cycle. The antenna measurement module 730 may also cause the receivers 710 to be switched back to the first antenna set before an antenna measurement gap ends, and thus communications using the first antenna set may resume after the antenna measurement gap.

Various measurement operations may be performed within an antenna measurement gap, e.g., as described with reference to FIGS. 5A and 5B. For example, samples may be captured from one or more signals received on the second antenna set during such a gap. The antenna measurement module 730 may generate, based on the captured samples, one or more metrics that may measure a quality or a channel condition associated with the second antenna set. For example, a receive signal power (e.g., RSRP) may be measured. Sample capture and processing may be pipelined across multiple time gaps, e.g., as illustrated in FIG. 5B. For example, the measurement metrics may be generated in a time gap from samples captured during a previous time gap.

The antenna switch diversity module 735 may generally provide means for selecting one or more antennas, with which the receivers 710 and the transmitters 720 are coupled for communications with a base station. The antenna selection and switching may realize a form of spatial diversity afforded by all available antennas, despite the fewer number of receivers and transmitters compared to the total number of available antennas. The antenna switch diversity module 735 may make the antenna selection decision based at least on measurements of additional or different antennas (e.g., the second antenna set). In some implementations, the antenna switch diversity module 735 may also perform several functions of the antenna measurement module 730, such as, for example, monitoring a trigger condition for measurement on additional antennas. The selected antennas may correspond to a particular antenna configuration, e.g., as described with reference to FIG. 3.

In one or more disclosed examples, the functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communication, comprising:
   communicating with a base station on a frequency band on a first antenna set, the first antenna set comprising at least one of multiple antennas, wherein one or more receivers are coupled with the first antenna set;
   determining that a condition on the first antenna set is triggered;
   switching the one or more receivers to a second antenna set during a time gap in which reception on the first antenna set can be skipped, the second antenna set comprising at least another one of the multiple antennas; and
   measuring the second antenna set on the frequency band, based on one or more signals received on the second antenna set during the time gap.

2. The method of claim 1, wherein one or more transmitters are coupled with the first antenna set.

3. The method of claim 2, wherein the condition is triggered if a transmit power on the first antenna set exceeds a power level for more than a threshold percentage of time.

4. The method of claim 1, wherein the condition is triggered if a difference between a primary receiver and a secondary receiver in receive signal power on the first antenna set is below a threshold.

5. The method of claim 1, further comprising:
   selecting the second antenna set based on physical antenna placement of the second antenna set relative to the first antenna set.

6. The method of claim 1, wherein the time gap is within an inter-frequency or inter-radio access technology measurement gap.

7. The method of claim 1, wherein the time gap is within an off-duration of a discontinuous reception (DRX) cycle.

8. The method of claim 1, further comprising:
   switching back to the first antenna set from the second antenna set before the time gap ends.

9. The method of claim 1, wherein measuring the second antenna set comprises:
   capturing samples from the one or more signals during the time gap; and
   generating one or more metrics on the second antenna set based on samples captured during a previous time gap.

10. The method of claim 1, further comprising:
    determining a third set of one or more antennas based at least on measurements on the second antenna set.

11. A user equipment (UE), comprising:
    multiple antennas;
    one or more receivers; and
    a processor coupled with the one or more receivers, the processor configured to:
    communicate with a base station on a frequency band on a first antenna set, the first antenna set comprising at least one of the multiple antennas, wherein the one or more receivers are coupled with the first antenna set;
    determine that a condition on the first antenna set is triggered;
    switch the one or more receivers to a second antenna set during a time gap in which reception on the first antenna set can be skipped, the second antenna set comprising at least another one of the multiple antennas; and
    measure the second antenna set on the frequency band, based on one or more signals received on the second antenna set during the time gap.

12. The UE of claim 11, further comprising:
    one or more transmitters coupled with the first antenna set.

13. The UE of claim 12, wherein the condition is triggered if a transmit power on the first antenna set exceeds a power level for more than a threshold percentage of time.

14. The UE of claim 11, wherein the condition is triggered if a difference between a primary receiver and a secondary receiver in receive signal power on the first antenna set is below a threshold.

15. The UE of claim 11, wherein the processor is further configured to:
    select the second antenna set based on physical antenna placement of the second antenna set relative to the first antenna set.

16. The UE of claim 11, wherein the time gap is within an inter-frequency or inter-radio access technology measurement gap.

17. The UE of claim 11, wherein the time gap is within an off-duration of a discontinuous reception (DRX) cycle.

18. The UE of claim 11, wherein the processor is further configured to:
    switch back to the first antenna set from the second antenna set before the time gap ends.

19. The UE of claim 11, wherein the processor configured to measure the second antenna set comprises the processor configured to:
    capture samples from the one or more signals during the time gap; and
    generate one or more metrics on the second antenna set based on samples captured during a previous time gap.

20. The UE of claim 11, wherein the processor is further configured to:
    determine a third set of one or more antennas based at least on measurements on the second antenna set.

21. An apparatus of wireless communication, comprising:
    means for communicating with a base station on a frequency band on a first antenna set, the first antenna set comprising at least one of multiple antennas, wherein one or more receivers are coupled with the first antenna set;

means for determining that a condition on the first antenna set is triggered;

means for switching the one or more receivers to a second antenna set during a time gap in which reception on the first antenna set can be skipped, the second antenna set comprising at least another one of the multiple antennas; and means for measuring the second antenna set on the frequency band, based on one or more signals received on the second antenna set during the time gap.

22. The apparatus of claim 21, wherein the condition is triggered if a difference between a primary receiver and a secondary receiver in receive signal power on the first antenna set is below a threshold.

23. The apparatus of claim 21, wherein the time gap is within an inter-frequency or inter-radio access technology measurement gap.

24. The apparatus of claim 21, wherein the time gap is within an off-duration of a discontinuous reception (DRX) cycle.

25. The apparatus of claim 21, wherein the means for measuring the second antenna set comprises:

means for capturing samples from the one or more signals during the time gap; and means for generating one or more metrics on the second antenna set based on samples captured during a previous time gap.

26. The apparatus of claim 21, further comprising:

means for determining a third set of one or more antennas based at least on measurements on the second antenna set.

27. A non-transitory computer-readable medium having instructions stored thereon, the instructions comprising codes executable for an apparatus to perform:

communicating with a base station on a frequency band on a first antenna set, the first antenna set comprising at least one of multiple antennas, wherein one or more receivers are coupled with a first antenna set;

determining that a condition on the first antenna set is triggered;

switching the one or more receivers to a second antenna set during a time gap in which reception on the first antenna set can be skipped, the second antenna set comprising another one of the multiple antennas; and measuring the second antenna set on the frequency band, based on one or more signals received on the second antenna set during the time gap.

28. The medium of claim 27, wherein the condition is triggered if a difference between a primary receiver and a secondary receiver in receive signal power on the first antenna set is below a threshold.

29. The medium of claim 27, wherein the time gap is within an inter-frequency or inter-radio access technology measurement gap.

30. The medium of claim 27, wherein the codes for measuring the second antenna set comprises:

codes for capturing samples from the one or more signals during the time gap; and codes for generating one or more metrics on the second antenna set based on samples captured during a previous time gap.

* * * * *